Patented Oct. 17, 1933

1,931,059

UNITED STATES PATENT OFFICE 1,931,059

PURIFICATION OF ARYL ESTERS OF PHOSPHORIC ACID

Erik Clemmensen, St. Louis, Mo., assignor, by mesne assignments, to Monsanto Chemical Company, a corporation of Delaware No Drawing. Application November 18, 1932 Serial No. 643,189

7 Claims. (Cl. 260—98)

This invention relates to the purification of neutral phenolic esters of phosphoric and thiophosphoric acids, examples of which include tritolyl phosphate, triphenylphosphate, mixed tolyl phosphates, tolyl xylyl phosphates, alkyl tolyl phosphates, alkyl phenyl phosphates, notably methyl diphenyl phosphate, ethyl ditolyl phosphate, etc. The present application is a continuation-in-part of my co-pending applications, Serial Numbers 485,317 and 558,337, filed September 29, 1930 and August 20, 1931, respectively. In my co-pending applications I have disclosed a method of purification which involves the use of potassium permanganate or other water soluble permanganates at ordinary or slightly elevated temperatures with the view of improving the color, odor, and stability of the esters.

The phenols which are employed in the manufacture of the esters, particularly the cresols and the xylenols are of coal tar origin and not infrequently include as impurities bases of the pyridine species as well as materials of a naphthalenic species, both of which, and the latter in particular, are objectionable because of the odor and other undesirable characteristics imparted to the final product. Since these impurities are present in the cresylic acids in very small amounts the separation therefrom is difficult. At the same time the amount which is present is sufficient to impair the quality of the ester product.

I have now found that naphthalenic impurities may be removed conveniently after the ester is formed by subjecting the ester to the action of an aqueous solution of a permanganate at elevated temperatures. The treatment may be effected either in an alkaline, neutral or acidic medium. In the former case an amount of soda ash is added to the aqueous permanganate in order to maintain alkalinity during the course of the treatment. The separation of the precipitated manganese dioxide and other phases of the purification may follow that proposed in my aforementioned applications.

In practicing the invention as applied to tritolyl phosphate, which may include some xylyl phosphate esters by reason of the presence of xylenols in the cresylic acid utilized in preparing the ester, I wash the ester obtained by the condensation of phosphorous oxychloride and cresylic acid, with a caustic soda solution of 3–6% concentration in order to remove the alkaline soluble impurities, particularly the acidic impurity, including the unreacted cresylic acid, the monotolyl and ditolyl acid phosphates, etc. This operation is performed advantageously at ordinary room temperatures by agitating or otherwise washing the ester with the aqueous alkali solution. It is convenient and advantageous to wash the ester one, two or even three times, each time using a fresh solution of the alkali. Thereafter the ester is washed with water to eliminate alkalinity and it is treated with a dilute aqueous solution of a mineral acid such as sulfuric acid while maintaining an elevated temperature preferably 70–100° C., sufficient acid being employed to assure a distinctly acid condition. For this purpose a Congo red indicator may be employed. In lieu of dilute sulfuric acid one may employ other acids; similarly one may employ other temperature conditions. For example, one may employ a small amount of concentrated hydrochloric acid at ordinary room temperatures. The acid wash treatment is continued or repeated, if necessary, until no pyridine-like odor is perceptible.

Subsequently the ester is washed free of acid by means of water, preferably with the aid of a small amount of a base, such as soda ash. The resulting ester is then agitated with an equal or even larger volume of water containing approximately 2%, more or less, by weight of soda ash based on the weight of the ester, to which potassium permanganate is added from time to time to maintain a distinct purple coloration, the temperature being maintained at approximately 80–100° C. As soon as the permanganate coloration is found to persist the excess permanganate is removed by washing with water and the heavy precipitate of manganese dioxide is filtered or otherwise removed as by dissolving the same with a suitable reducing agent under acid conditions, such as sodium sulfite or bisulfite or sulfurous acid. The ester is then washed free of any water soluble substances and dried in the usual manner.

If desired, one may effect the permanganate treatment at elevated temperatures without the addition of the alkali, that is, under neutral conditions or under distinctly acidic conditions by the addition of a small amount of a mineral acid such as sulfuric acid, as described in my aforementioned applications. Moreover, the permanganate treatment for removal of naphthalenic odors may be employed independently of the acid wash treatment for removal of pyridine-like impurities.

The ester product which is obtained is colorless and free of naphthalenic odors.

Obviously, various methods of preparing the crude ester may be employed and other acid reacting or alkali reacting agents may be employed without departing from the spirit of this invention. Similarly the precise temperature conditions may be varied as well as the time of reaction or washing.

What I claim is:

1. In the purification of neutral aryl phosphate esters containing naphthalenic impurities, the step which includes subjecting the ester to the action of an aqueous solution of a water soluble permanganate while maintaining a temperature sufficiently high to decompose the naphthalenic impurities.

2. In the purification of a neutral tolyl phosphate ester obtained by the inter-action of phosphorous oxychloride with cresylic acid of a coal tar origin containing naphthalenic impurities, the step in the purification of the ester whereby the naphthalenic impurities are eliminated which comprises subjecting the ester to the action of an aqueous solution of a water soluble permanganate while maintaining a temperature of approximately 80°–100° C.

3. The method as defined in claim 2 and further characterized in that the permanganate treatment is effected in the presence of an inorganic water soluble base.

4. The method as defined in claim 1 and further characterized in that the permanganate treatment is continued until the characteristic permanganate coloration persists after which precipitated manganese dioxide is removed from the ester by effecting dissolution thereof with the aid of an inorganic sulfite reagent under acid conditions and in the presence of water.

5. The method as defined in claim 2 and further characterized in that manganese dioxide which is formed as a result of the permanganate treatment is dissolved by means of an inorganic sulfite reducing agent under acid conditions.

6. In the purification of tri-aryl phosphate esters, according to which said esters are treated with an aqueous solution of a water soluble permanganate, manganese dioxide being formed during the treatment, the step which consists in dissolving manganese dioxide by subjecting the same to the action of a sulfurous reducing agent in the presence of water.

7. In the purification of tri-aryl phosphate esters the step of washing the ester with an aqueous alkaline solution of a water soluble permanganate until the characteristic permanganate coloration persists.

ERIK CLEMMENSEN.